United States Patent Office 3,787,369
Patented Jan. 22, 1974

3,787,369
PROCESS FOR PREPARING FIRE RETARDANT
POLYESTERS
Walter M. Zimberg, Tonawanda, Arthur C. Schulz, North
Tonawanda, and George C. Woehr, Buffalo, N.Y.,
assignors to Hooker Chemical Corporation, Niagara
Falls, N.Y.
No Drawing. Filed Sept. 20, 1971, Ser. No. 182,178
Int. Cl. C08g 17/12
U.S. Cl. 260—75 H                               15 Claims

ABSTRACT OF THE DISCLOSURE

An improved process for the preparation of unsaturated polyesters is provided. The process comprises the steps of:

(a) Forming a 1:1 adduct of a polyhalogenated cyclopentadiene and a polycarboxylic acid anhydride in which the latter is used in excess, and preferably the former is employed in a highly purified form, the adduction reaction being carried out in an atmosphere of an oxygen containing gas and preferably at relatively low temperature within the range of about 110 to about 145 degrees centigrade;

(b) Reacting the adduct mixture from step (a) with a polyol or polyol forming material, e.g., an alkylene oxide, preferably in the presence of phosphoric acid to catalyze the esterification reaction;

(c) Interrupting the reaction of Step (b) after the formation of the half ester but before the acid number of the reaction mixture is decreased to about 40, and distilling the mixture with steam until substantially all of the steam volatile components have been removed; and (d) Continuing the esterification of the adduct and polyol until an unsaturated polyester product having an acid number below about 40 is obtained, said (e) Unsaturated polyester having a light color, low corrosivity to mild steel and which is copolymerizable with ethylene monomers to form light colored infusible fire retardant polymers.

FIELD OF INVENTION

This invention relates to improvements in the preparation of unsaturated polyester compositions which include a chemically combined component to impart fire retardant character to the polyester composition, said component being an adduct of a polyhalogenated cyclopentadiene and an unsaturated polycarboxylic acid anhydride. More particularly, it relates to improvements in the preparation of unsaturated polyester compositions which include the adduct of hexachlorocyclopentadiene and maleic anhydride as the component imparting fire retardant character to the polyester.

BACKGROUND OF THE INVENTION

The production of infusible, insoluble polyester resins which are fire retardant and have high resistance to heat is of considerable industrial importance. For instance, castings, moldings, formed articles, or laminated structures bonded by polyester resins are, for many applications, required, or at least desired, to be resistant to fire and should endure heat without destruction. For example, castings for live electrical contacts, structural members, pipes, wall coverings, panels, ash trays, etc., should be fire retardant and/or should not be deteriorated by heat.

It is well known in this art to prepare fire retardant polyester resins by combining halogenated chemical adducts with polyols. For example, it is known that the maleic anhydride-halogenated cyclopentadiene Diels-Alder adduct when admixed with alpha-beta unsaturated dicarboxylic acids and anhydrides will react with glycols to form resinous polyester compositions which may be made insoluble and infusible by further reaction with copolymerizable olefins to form a cross-linked polymer. It is known further that such resins are often highly colored and may contain noxious or irritating contaminants which detract from their commercial acceptability. Such defects severely limit their fields of application.

A principal source of the color formers and irritants in these polyesters is in the Diels-Alder adducts. Various procedures for improving these adducts have been proposed. Thus, according to U.S. Pat. 3,112,339, chlorendic acid, the 1:1 adduct of hexachlorocyclopentadiene and maleic acid, is obtained in light color and high purity by crystallizing the crude chlorendic acid from a substantially immiscible solvent pair consisting of water and an organic solvent. It has also been proposed, according to U.S. Pat. 3,214,444, to purify chlorendic anhydride by contacting the crude anhydride with a substance capable of forming a constant boiling azeotrope with the chlorocarbon impurities contained in the anhydride adduct, and distilling off the azeotrope from the chlorendic anhydride. It is also known to purify Diels-Alder adducts by repeated recrystallization from organic solvents or by hydrolysis of the anhydride with alkaline agents, recrystallization of the alkali metal salts of the acid, acidification, and dehydration to recover the purified anhydride.

Although these prior art methods are useful in certain applications, they are not economically adapted to commercial operation in the area of application of fire retardant resins where low cost as well as high quality are prime considerations.

OBJECTS OF THE INVENTION

It is, therefore, a principal object of the present invention to devise a process for the preparation of fire retardant polyester resin compositions which is inexpensive, simple, and direct and which is adaptable to large scale commercial operations.

A more specific object is to devise an improved process for the preparation of unsaturated polyester resin compositions containing chlorendic anhydride or acid or other halogen analogs as essential components.

Other objects will be apparent to those skilled in this art from the following description of the invention.

As used herein, chlorendic anhydride is the Diels-Alder adduct of hexachlorocyclopentadiene and maleic anhydride and is chemically 1,4,5,6,7,7-hexachlorobicyclo-(2.2.1)-5-heptene-2,3-dicarboxylic anhydride.

SUMMARY OF THE INVENTION

In accordance with the present invention, it has been found that the unsaturated polyesters can be prepared by the simple, direct, inexpensive, and adaptable to commercial scale process which comprises the steps of:

(A) Reacting a polyhalogenated cyclopentadiene with an excess of an ethylenically unsaturated polycarboxylic acid compound in an atmosphere of an oxygen containing gas, (B) Reacting the total reaction mixture from Step (A), containing the 1:1 Diels-Alder adduct and excess unsaturated polycarboxylic acid compound, with a polyol or a polyol forming compound.

(C) Interrupting the reaction of Step (B) after the formation of a monoester product but before the acid number of the reaction mass has decreased to about 40, and distilling the reaction mass with steam until substantially all of the material distillable with steam has been removed, and (D) Continuing the reaction of the adduct mixture of Step (A) and the polyol until a unsurated polyester mixture having an acid number below about 40 is obtained, said unsaturated polyester composition from the reaction mixture of Step (D) which is light colored, of low corrosivity to mild steel and copolymerizable with ethylenically unsaturated monomers to form light colored, infusible, fire retardant polymers.

DETAILED DESCRIPTION OF THE INVENTION

As is known, the polyester product obtained from the pure adduct, although it contains olefinic linkages is unreactive in the copolymerization reaction with ethylenic monomers, or other olefinic cross linking agents, such as styrene, divinyl compounds, diallyl compounds and the like. However, by carrying out the adduction reaction in the presence of an excess quantity of the dienophile component, the unsaturated polycarboxylic anhydride, the excess of this component not only serves to drive the adduction reaction more nearly to completion, but also reacts with the polyol component to form polyesters, which render the polyester compositions comprising the Diels-Alder adduct containing polyesters copolymerizable with the ethylenic monomers. The excess of the unsaturated polycarboxylic anhydride also serves to maintain the reaction mixture liquid and stirrable.

The reaction between the halogenated cyclopentadiene and excess of the polycarboxylic anhydride is preferably carried out in an atmosphere of an oxygen containing gas, such as oxygen, air, or substance which under the influence of heat decomposes to liberate oxygen. Preferably, air is used because of its effectiveness, low cost, and ready availability. The oxygen containing gas may be added continuously during the adduction reaction, for example, by passing a slow steady stream of air or oxygen through the reaction mass, or by substantially saturating the reaction vessel containing one or both of the reactants at the inception of the reaction.

The adduction reaction can be carried out at temperatures in the range of about 100 degrees centigrade and about 200 degrees centigrade. Preferably, this reaction is effected at temperatures in the range of about 110 to about 145 degrees centigrade. The reaction normally requires from about 1 to about 8 hours, depending upon the batch size and temperature, to proceed essentially to completion. As is known the reaction between hexachlorocyclopentadiene and maleic anhydride, which, at 150 degrees, centigrade, is more than 50 percent completed in the first hour, is difficult, if not impossible to carry to complete consumption of the chlorocarbon even after seven or eight hours. The presence of an excess of maleic anhydride improves the yield of Diels-Alder adduct with respect to the consumption of the chlorocarbon.

It is thus preferred to utilize an excess of the polycarboxylic anhydride reactant in this step of our improved process. Preferably, from about 1.1 to about 3.3 moles of the anhydride per mol of halocarbon are use and especially from about 1.4 to 1.8 moles of anhydride per mole of halocarbon are used.

Although hexachlorocyclopentadiene is the preferred halocarbon reactant, cyclopentadienes containing other halogens such as fluorine, bromine, and mixtures thereof with chlorine can be used, such as hexabromocyclopentadiene, 5,5-difluorotetrachlorocyclopentadiene and the like.

It is preferred to utilize the halogenated cyclopentadiene component in a highly purified state. These compounds can be purified according to methods known in the art. For example, hexachlorocyclopentadiene can be purified by fractional distillation under reduced pressure to obtain material of 98 percent or higher purity. Thus crude hexachlorocyclopentadiene can be distilled through a two foot column packed with glass tubing or Raschig rings, under a vacuum of about 20 mm. pressure to obtain a purified product boiling at about 125 degrees centigrade and analyzing about 98 percent by weight or more of hexachlorocyclopentadiene.

Maleic anhydride is the preferred polycarboxylic anhydride. Other dienophiles can be used such as tetrahydrophthalic, dichloromaleic, dibromomaleic, itaconic, and citraconic anhydrides and mixtures thereof can be used.

The reaction mixture containing the Diels-Alder adduct and excess of the polycarboxylic anhydride is used directly in the esterification step of our process. Addition of the same or different dicarboxylic acid or anhydride may be added to the mixture prior to, or during, the polyesterification step.

It is preferred that the atmosphere of the oxygen containing gas in which the adduct mixture had been formed be replaced by an atmosphere of an inert gas, such as nitrogen, carbon dioxide, and the like, prior to the addition of the polyesterifying compound to the adduct mixture. It has been found that the color of the polyesters obtained is somewhat better if the oxygen containing atmosphere is replaced by an inert atmosphere prior to addition of the polyol rather than after the addition thereof.

This step of replacing the atmosphere can be carried out by simply flushing the vessel containing the adduct mixture with a current of the inert gas. Alternatively the crude adduct mixture can be cooled in an inert atmosphere to solidify it, then after pulverizing the solidified adduct mixture, the mixture can be charged to a vessel from which the air has been flushed with the inert gas.

The ground adduct mixture can be added to the vessel which has been flushed with inert gas, and the polyesterifying agent added. Other methods of replacing the oxygen containing atmosphere with an inert gas atmosphere will be obvious to those skilled in the art.

The process of preparing fire retardant unsaturated polyesters which includes the step of adding a polyol to a chlorendic anhydride composition in an atmosphere of an inert gas is disclosed and claimed in copending application of Rushton et al., S.N. 172,595, filed Aug. 17, 1971.

The polyesterification is effected by means of a reactant which forms esters with the acid groups of the adduct containing mixture. Such reactants include polyols and alkylene oxides having from 2 to 6 carbon atoms. Of the polyols, diols are preferred.

Examples of the polyhydric alcohols which can be used for this step include the following:

ethylene glycol
diethylene glycol
1,2-propylene glycol
dipropylene glycol
1,4-butane diol
1,4-butylene diol
1,3-butane diol
1,5-pentane diol
1,6-hexane diol
glycerine
trimethylol propane
neopentyl glycol Mixtures of these and equivalent polyols are contemplated also.

As examples of the alkylene oxides which can be used the following are mentioned.

ethylene oxide
1,2-propylene oxide
1,3-propylene oxide
1,2-butylene oxide
2,3-butylene oxide
2,3-pentylene oxide
1,2-hexylene oxide
1,2-dodecylene oxide
styrene oxide
methyl styrene oxide
methyl glycidyl oxide
phenyl glycidyl oxide
cyclohexane monooxide
vinyl cyclohexane monooxide
allyl glycedyl ether Mixtures of these and equivalent oxides are contemplated also.

The temperature for carrying out the esterification reaction ranges between about 100 degrees and about 200 degrees centigrade, although higher or lower temperatures can be used. Advantageously the reaction is carried out between about 160 degrees and 190 degrees centigrade.

Following admixture of the polyesterifying agent to the adduct mixture, which is effected in an atmosphere of inert gas, the inert gas can be passed through the reaction mass to accelerate the progress of the esterification reaction.

The progress of the reaction can be followed by collecting and measuring the water liberated, by acid number and viscosity of the resin, or by other methods known in this art. The extent to which the reaction is carried out will depend upon a number of factors, such as the desired viscosity, melting point, duration of the reaction, and the like.

An azeotroping solvent, such as xylene, may be present in the reaction mixture, to facilitate removal of the water produced in the reaction.

It has been found that polyesters produced in accordance with prior art procedures tended to be somewhat dark in color. Moreover, these resins had poor and variable stability as well as undergoing a rather rapid viscosity increase where the acid number decreased to below 40. Such resins, when admixed with ethylenic monomers, such as styrene, were corrosive to mild steel. We have found that these disadvantages resulting from the prior art methods can be largely prevented by interrupting the polyesterification step at a point after addition of the polyol and when most of the polyol has been partially reacted, that is, the polyol has reacted to the half ester or monoester stage, but before the acid number of the polyester reaction mass has decreased to 40, and at this time distilling the reaction mass with steam. By this means, impurities, such as chlorocarbons, are distilled from the reaction mass, and the propensity of the polyester composition to undergo viscosity increase as the acid number thereof decreases below 40, is effectively eliminated. The corrosivity of the finished polyester composition is reduced to the point where inhibitors are not required by this means also. Further the steam stripped polyester compositions have higher peak exotherms, approaching about 200 degrees centigrade and the fumaric to maleic ratio of such resins is increased. The color of the resultant resins is improved to a perceptible degree also.

The steam-stripping step can be carried out in a manner conventional in steam distillation operations. Low pressure or high pressure steam can be used. In general, the esterification mass should be held at about the same temperature as that used in the half-ester formation step. Thus the steam should be admitted to the reaction mass while maintaining said mass at a temperature within the range of about 130 degrees to about 170 degrees centigrade. The steam stripping is continued until most and preferably substantially all of the steam volatile components have been removed from the reaction mass. The temperature of the reaction mass can be maintained at the desired point by use of superheated steam, by external heating of the reaction mass, and the like, as will be obvious to those skilled in the art.

Following completion of this steam distillation or steam stripping, the reaction mass is heated to remove water and the heating continued to complete the polyesterification reaction.

Esterification catalysts, such as para-toluenesulfonic acid, benzenesulfonic acid, beta naphthalene sulfonic acid, phosphoric acid, amines such as pyridine, triethylamine, quinoline, and the like may be added to the reaction mixture.

Phosphoric acid, in amounts within the range of about 0.1 to 10 percent by weight of the reaction mass, is preferred. This substance has been found to result in a significant suppression of undesirable color, an increase in fire retardance and to catalyze the isomerization of the maleic acid to fumaric acid in the resin. Surprisingly, other phosphorus derivatives such as those disclosed in U.S. Pat. 2,931,746, were without significant effect when used as catalysts in this reaction.

The proportion of polyhydric alcohol or alkylene oxide used is controlled approximately by the proportion of acids or anhydrides in the esterification reaction mixture. In general, we prefer to react these essential components in approximately equimolecular proportions. However either the acids or alcohols may be present in excess, for example up to about 10 percent of either in excess, to prepare polyesters of desired molecular weight, viscosity, acid number, and the like.

The properties, specifically the flexibility of the polyester resins and the co-polymerized resins obtained therefrom can be controlled to a significant degree by the choice of polyesterification agent used. Thus polyester resins having a relatively high degree of flexibility are produced by utilizing alkylene oxides as the source of the polyols for the esterification. Such polyesters are eminently useful for the preparation of resins to be used as wall coverings, wire coatings, and in general applications where flexibility is an important characteristic. It is believed that this high degree of flexibility in the resultant resins is due to relatively low temperature required in the esterification step, which limits the extent of the isomerization of maleic to fumaric acid which occurs during this step. We have found that the ratio of fumaric to maleic acid esters is exceedingly low in polyesters formed when alkylene oxides are used as the source of polyol component.

Conversely, polyesters obtained using glycols as the esterifying polyols contain a relatively high ratio of fumaric to maleic esters. Such resins are relatively brittle. It is known to modify such resins by inclusion of glycols such as diethylene glycol, tetramethylene glycol and the like, to impart a more flexible character to such resins. However, such additions add to the cost of the resultant resin and accordingly it is economically more attractive, when preparing polyesters for applications where flexibility is a desirable attribute to utilize alkylene oxides as the source of the polyol component.

Inasmuch as alkylene oxides are basically cheaper than the corresponding glycols, it is often desirable to prepare the polyesters utilizing alkylene oxides as the source of the glycol component, and to add fumaric acid to the adduct mixture, thereby introducing hardness and less flexibility to the resultant polyester composition, which results in a more economic process.

The resultant ethylenically unsaturated polyester can be cured by copolymerizing with an ethylenically unsaturated monomeric material copolymerizable therewith, preferably in the presence of a catalytic amount of a conventional polymerization catalyst such as a free radical catalyst of which benzoyl peroxide is an example.

Promoters, such as cobalt naphthenates are conventionally used too as in the co-polymerization reaction also especially for curing at moderate temperatures. In particular, it has been found that polyester resins, prepared using phosphoric acid as a catalyst for the polyesterification, have a somewhat prolonged room temperature cure times. In the curing of such polyester resin compositions, it has been found that the corresponding vanadium salts, such as Vanadium Ten Cem (Mooney Chemical Co.) which is believed to be a solution of the vanadium salt of an organic acid such as undecanoic acid, 2-ethylhexanoic acid, or tall oil fatty acids, are effective promoters in combination with organic peroxides, such as methyl ethyl ketone peroxides, benzoyl peroxide, cumyl peroxides, and the like, to provide rapid curing, that is copolymerization of the polyester resin composition containing phosphoric acid residues.

The ethylenically unsaturated monomers which can be used for this copolymerization reaction can be varied widely. The monomers which can be used include vinylidene compounds or mixtures thereof capable of crosslinking ethylenically unsaturated polymer chains at their points of unsaturation and usually they contain the reactive group

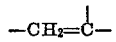

Specific examples include, styrene
chlorostyrenes
methylstyrenes, such as alpha methyl styrene,
p-methylstyrene
divinylbenzenes
methylmethacrylate
methyl acrylate
allyl acetate
vinyl acetate
diallyl sebacate
diethylene glycol bis (allylcarbonate)
triallyl phosphate
diallylbenzene phosphonate
diallyl chlorendate
diallyl tetrachlorophthalate Mixtures of these and equivalent materials are contemplated also.

The monomer, or mixture thereof, can be admixed with the polyester in an amount sufficient to produce a crosslinked polymer and the mixture heated, in the presence of a suitable catalyst, to an elevated temperature to crosslink or cure the polymer mixture. With proper catalyst systems such as cobalt naphthenate and methyl ethyl ketone peroxide, room temperature cures can be obtained.

To prevent premature polymerization at this stage, a polymerization inhibitor, such as hydroquinone, is advantageously added to the mixture, or preferably to one of its components prior to mixing, especially if the curable mixture is to be stored or shipped in commerce prior to curing or effecting the co-polymerization reaction.

In order that this invention may be more readily understood and to further illustrate the details thereof, the following examples which show the preferred manner of carrying out the improved process are given. Parts and percentages are by weight and temperatures are given in degrees centigrade, unless otherwise specified.

Corrosivity of the prepared resin compositions was determined by a test procedure adopted from the National Association of Corrosion Engineers Standard Test Procedure TM-01-06. The procedure used herein was carried out as follows:

About 150 milliliters (about 200 grams) of resin were placed in a 300 mm. x 38 mm. test tube. One specimen, ½ in. x 3 in. x ⅛ in., of AISI 1010 mild steel (prepared as outlined in NACE TM-01-69 Standard) was suspended in the resin from a Teflon string so that ¾ of the steel specimen was immersed in the resin. The tube was sealed with a Teflon wrapped rubber stopper and placed in a constant temperature oil bath. The specimen was exposed until the resin showed signs of polymerization. The specimen was thereafter evaluated according to the TM-01-69 standard procedure.

EXAMPLE 1

Molten maleic anhydride, 117 parts (1.19 moles) was added over about two hours to 200 parts (0.896 mole) of pure (99.3 area percent by gas chromatography analysis) hexachlorocyclopentadiene, at about 130 degrees. The mixture was maintained at about 144 degrees for about four hours. The resultant adduct mixture contained about 0.23 percent of unreacted hexachlorocyclopentadiene. The reaction vessel was flushed out with a stream of nitrogen for about one half hour, and then 82 parts (1.32 moles) of ethylene glycol were aadded in one hour to the adduct mixture at 137 to 167 degrees. The mixture was heated at about 161 degrees for about four hours, passing a slow steady stream of nitrogen through the mass.

At this point, the mixture was distilled with steam while maintaining the temperature of the mass at 155 to 161 degrees. The steam distillation was continued at this temperature for about four hours until the condensed distillate was clear. Thereafter the reaction mass was heated at 150 to 160 degrees, in a nitrogen atmosphere for about 10.5 hours. The acid number of the polyester mass was 42.7. The maleic to fumaric ratio of the resin mass was 0.08.

A portion, 200 parts, of the polyester mass was admixed with 0.01 percent of the weight of styrenated resin composition of toluene hydroquinone, and then with 80 parts of styrene. The corrosivity to mild steel of this mixture was determined to be 0.08 mils/year. The mixture has a color (Gardner) of about 6–7, an SPI gel time of 5.3 minutes, a peak exotherm of 193 degrees, a stability at 70 degrees of about 91 hours, and a room temperature gel time of 6.25 minutes.

EXAMPLE 2

For comparison, the procedure of Example 1 was essentially repeated, but omitting the steam distillation of the esterification mass, in the following manner.

Molten maleic anhydride, 88 parts (0.9 mole) was added over two hours to pure (99.71 percent) hexachlorocyclopentadiene, 150 parts (0.55 mole), at about 130 degrees. The mixture was maintained at about 144 degrees for about four hours. The reaction vessel which contained the adduct mass, comprising 0.38 percent unreacted chlorocarbon, was flushed with nitrogen for about ½ hour, and then 61 parts (0.984 mole) of ethylene glycol were added in about one and one half hours at 144 to 164 degrees. This mixture was heated in a current of nitrogen for about 10 hours at 158 to 160 degrees. The acid number of the polyester mass was 33.1. The maleic to fumaric ratio of the resin mass was 0.24.

A 200-part portion of the resin mass was cooled slightly and 0.01 percent by weight of the styrenated resin of toluene hydroquinone was added thereto followed by 80 parts of styrene.

The styrenated resin had the following properties.

color: 6.5 (Gardner)
corrosivity to mild steel: 4.71 mils/yr.
SPI gel time: 6.2 minutes
peak exotherm: 173 degrees
70 degree stability: 129 hours
room temperature gel time: 13 minutes

EXAMPLE 3

This example illustrates the beneficial effect of phosphoric acid and steam stripping.

Molten maleic anhydride, 111 parts (1.13 moles) was added to pure (99.8 percent) hexachlorocyclopentadiene, 190 parts (0.697 mole), over a period of 1¾ hours at about 143 degrees. The mixture was heated for about 3¾ hours at about 138 degrees to complete the adduction reaction, as evidenced by the 0.48 percent content of chlorocarbon in the adduction mass.

Thereafter, the reaction vessel was flushed with nitrogen for one half hour, phosphoric acid, 0.1% of the mixture and 77 parts (1.2 moles) of ethylene glycol were added. The mixture was heated from 129 to 159 degrees in four hours and distilled with steam at 158 degrees for four hours, and then heated at 160 degrees for 13 hours. During this final heating period, when the acid number of the mixture had decreased to 45, 0.013 percent, based on the weight of the mixture, of toluene hydroquinone was added and the heating continued until the acid number of the mixture was 38.9.

A 200-part portion of the polyester mass was removed and admixed with 80 parts of styrene. The properties of the styrenated resin were, color: 4.5 (Gardner)
peak exotherm: 199 degrees*
70 degrees stability: about 128 hours
SPI gel time: 6.0 minutes

*Using Vanadiam Ten Cem promoter and methylethylketone peroxide catalyst.

EXAMPLE 4

Repetition of the procedure described in Example 3 above but omitting the phosphoric acid catalyst in the esterification step resulted in a styrenated product having the following properties color: 7.5 (Gardner)
peak exotherm: 192 degrees*
70 degree stability: abt. 186 hours
SPI gel time: 8.3 minutes

*Using cobalt naphthenate as promoter and methylethylketone peroxide as catalyst—acid number of polyester resin was 39.2.

EXAMPLE 5

This example illustrates the beneficial effect of carrying out the adduction reaction at low temperatures, i.e., about 140 degrees.

Molten maleic anhydride, 111 parts (1.13 moles) was added over a period of about 1¼ hours at about 135 degrees to pure (99.9+ percent) hexachlorocyclopentadiene, 190 parts (0.697 mole). The mixture was heated to and maintained at about 140 degrees for four hours. The resultant crude adduct mixture, which contained about 1.21 percent of unreacted chlorocarbon, was flushed with nitrogen for about ½ hour to replace the atmosphere of air with the inert gas, nitrogen, prior to addition of the polyol.

Thereafter, 77 parts (1.24 moles) of ethylene glycol were added over about 2¼ hours as the mass was heated from about 129 degrees to about 160 degrees in about four hours. The reaction mixture was then distilled with steam, at about 153 degrees, for about four hours. The reaction mixture was heated, in a current of nitrogen gas, at about 160 degrees for about 14¾ hours at which time the acid number of the mixture was 38.0. During this period, when the acid number of the mixture was 42, 0.015 percent of the weight of the mass of toluene hydroquinone was added to stabilize the mixture.

A portion, about 200 parts, of the polyester mixture was removed and to it were added 80 parts of styrene. The styrenated polyester had the following properties.

color: 5 (Gardner)
peak exotherm: 196.7 degrees
SPI gel time: 6.4 minutes
70-degree stability: abt. 134 hours

EXAMPLE 6

For comparison, the procedure of Example 5 was repeated in all essential details except that the adduction reaction mixture was heated for about 2 hours at about 157 degrees, after the addition of the maleic anhydride to the hexachlorocyclopentadiene at about 126 degrees. The crude adduct mixture contained about 1.45 percent of unreacted chlorocarbon. In this run, the polyester mixture, after steam stripping, 4 hours at 153 degrees, required an additional heating period of only eleven hours at 159 degrees, to produce a polyester mixture of acid number 38.0.

The styrenated polyester mixture, 200 parts of polyester and 80 parts of styrene, had the following properties.

color: 11 (Gardner)
peak exotherm: 191.3 degrees
SPI gel time: 6.7 minutes
70-degree stability: 120 hours It can thus be seen that the product of Example 6 had significantly darker color (11) than that of Example 5. This darker color can be attributed to the higher temperature (about 157 degrees) of the adduction step in Example 6, as compared to the lower temperature (about 140 degrees) of the adduction step in Example 5.

EXAMPLE 7

To 380 parts (1.39 moles) of hot (114 degrees) hexachlorocyclopentadiene, 223 parts (2.28 moles) of molten maleic anhydride were added in about 50 minutes. The resulting mixture was heated to and maintained at about 130 degrees for six hours.

The reaction flask was purged with nitrogen for about 45 minutes, and then 156.5 parts (2.52 moles) of ethylene glycol were added in twenty minutes while maintaining the mixture at 127 to 130 degrees. Seven parts of phosphoric acid were added and the reaction mass was heated to and maintained at 150 degrees for about seven hours, while passing a steady stream of nitrogen over the mass. The acid number of the mixture decreased to 42.8. After the addition of 5 parts (0.08 mole) of ethylene glycol, the mixture was heated at about 150 degrees for about 1.5 hours longer or until the acid number had decreased to 35.4.

The resin with a Gardner color of less than 5, was cooled slightly and a portion, 200 parts, was mixed with 80 parts of styrene.

The resultant styrenated polyester resin was mixed with cobalt naphthenate promoter and methylethylketone peroxide catalyst and required 3832 minutes at room temperature to cure. The cured resin was dark pink in color.

When a vanadium salt, Vanadium Ten Cem, was used in place of cobalt naphthenate as promoter, the resin required only six minutes at room temperature to cure to a pale green resin product.

This experiment illustrates the use of phosphoric acid as a catalyst for the preparation of light colored polyesters. The polyesters however, an admixture with styrene, when promoted with cobalt naphthenate, require an exceedingly long period to co-polymerize at room temperature.

Vanadium salts, e.g., Vanadium Ten Cem, function as surprisingly effective promoters giving relatively short room temperature cure times and hence overcome the undesirable effect of the phosphoric acid.

The present invention has been described with reference to particular embodiments and examples. As will be apparent to those skilled in this art, variations and modifications in those embodiments can be made without departing from the scope or spirit of the invention. Such variations and modifications are intended to be within the scope of this invention which is to be limited only by the appended claims.

What is claimed is:

1. In the process of preparing unsaturated polyesters which comprises the steps of reacting a mixture of a Diels-Alder adduct of a polyhalogenated cyclopentadiene and a polycarboxylic anhydride and an alpha-beta unsaturated polycarboxylic acid compound with a polyol, the improvement which comprises interrupting the esterification reaction after the formation of the half ester but before the acid number of the reaction mass has decreased to about 40, steam stripping the reaction mass at about the same temperature as that used in the half-ester formation step until substantially all of the steam volatile components have been removed and completing the polyesterification by heating the reaction mass until the acid number thereof has decreased to below about 40.

2. The process of claim 1 wherein the halogenated cyclopentadiene is hexachlorocyclopentadiene.

3. The process of claim 2 wherein the polycarboxylic acid anhydride is maleic anhydride.

4. The process of claim 3 wherein the maleic anhydride is present in an amount which is in excess of the amount required to form the 1:1 adduct.

5. The process of claim 4 wherein the hexachlorocyclopentadiene is a purified hexachlorocyclopentadiene and contains in excess of 98 percent by weight of hexachlorocyclopentadiene.

6. The process of claim 5 wherein the polyol is a diol.

7. The process of claim 1 wherein the steam stripping step is carried out at a temperature of about 130 degrees to about 170 degrees centigrade.

8. The process which comprises:
   (1) heating, in at atmosphere of an oxygen containing gas a polyhalogenated cyclopentadiene and an alpha-beta unsaturated polycarboxylic acid compound, the latter being in an amount in excess of the amount required to form the 1:1 Diels-Alder adduct,
   (2) replacing the atmosphere of oxygen containing gas with an atmosphere of an inert gas,
   (3) heating the adduct mixture of Step 3 with an esterifying agent selected from the group consisting of polyols and alkylene oxides,
   (4) interrupting the reaction of Step 3 after the substantial formation of the half ester but before the acid number of the reaction mass has decreased to about 40,
   (5) steam stripping the reaction mass at about the same temperature as that used in the reaction of Step 3 until substantially all of the steam volatile components have been removed, and
   (6) continuing the polyester forming reaction until an unsaturated polyester product having an acid number of below about 40 is obtained, said unsaturated polyester product having a light color, low corrosivity to mild steel and being co-polymerizable with ethylenic monomers to form light colored infusible fire retardant polymers.

9. The process of claim 8 in which the halogenated cyclopentadiene is hexachlorocyclopentadiene.

10. The process of claim 9 in which the hexachlorocyclopentadiene is a purified hexachlorocyclopentadiene and contains at least about 98 percent by weight of hexachlorocyclopentadiene.

11. The process of claim 10 in which the polycarboxylic acid compound is maleic anhydride.

12. The process of claim 8 in which the polycarboxylic acid compound is anhydride.

13. The process of claim 8 wherein the steam stripping step is carried out at a temperature of from about 130 degrees to about 170 degrees centigrade.

14. The process which comprises:
   (1) heating in an atmosphere of an oxygen containing gas a polyhalogenated cyclopentadiene and an alpha-beta unsaturated polycarboxylic acid compound, the latter being in an amount in excess of the amount required to form the 1:1 Diels-Alder adduct,
   (2) replacing the atmosphere of oxygen containing gas with an atmosphere of an inert gas,
   (3) reacting the adduct mixture of Step 1 with an esterifying agent selected from the group consisting of polyols and alkylene oxides until the substantial formation of the half ester but before the acid number of the reaction mass has decreased to about 40,
   (4) steam stripping the reaction mass at about the same temperature as that used in the reaction of Step 3 until substantially all of the steam volatile components have been removed, and
   (5) continuing the polyester formation reaction until an unsaturated polyester product having an acid number below about 40 is obtained, said polyester product having a light color, low corrosivity to mild steel, and being co-polymerizable with ethylenic monomors to form light colored, infusible fire-retardant polymers.

15. The process of claim 14 wherein the steam stripping step is carried out at a temperature of about 130 degrees to about 170 degrees centigrade.

References Cited
UNITED STATES PATENTS
3,214,444    10/1965    Zimmer et al. _____ 260—346.3

MELVIN GOLDSTEIN, Primary Examiner

U.S. Cl. X.R.
260—863, 869